US012748296B2

(12) United States Patent
Lee et al.

(10) Patent No.: US 12,748,296 B2
(45) Date of Patent: Sep. 29, 2026

(54) MANAGING ADAPTIVE MEASUREMENT FOR HIGH-RESOLUTION MEASUREMENT

(71) Applicant: Arizona Board of Regents on Behalf of the University of Arizona, Tucson, AZ (US)

(72) Inventors: Kwan Kit Lee, Tucson, AZ (US); Michael Grace, Tucson, AZ (US); Amit Ashok, Tucson, AZ (US); Saikat Guha, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 363 days.

(21) Appl. No.: 18/289,232

(22) PCT Filed: May 6, 2022

(86) PCT No.: PCT/US2022/027987
§ 371 (c)(1),
(2) Date: Nov. 2, 2023

(87) PCT Pub. No.: WO2022/235994
PCT Pub. Date: Nov. 10, 2022

(65) Prior Publication Data

US 2024/0160001 A1 May 16, 2024

Related U.S. Application Data

(60) Provisional application No. 63/186,018, filed on May 7, 2021.

(51) Int. Cl.
*G02B 21/36* (2006.01)
*G02B 27/58* (2006.01)
(Continued)

(52) U.S. Cl.
CPC ........... *G02B 21/361* (2013.01); *G02B 27/58* (2013.01); *G06N 7/01* (2023.01); *G06N 10/00* (2019.01)

(58) Field of Classification Search
CPC .... G02B 21/361; G02B 27/58; G02B 21/008; G02B 21/367; G06N 7/01; G06N 10/00; G06N 20/00
See application file for complete search history.

(56) References Cited

U.S. PATENT DOCUMENTS

2005/0276443 A1 12/2005 Slamani et al.
2019/0034800 A1 1/2019 Shiratani
(Continued)

OTHER PUBLICATIONS

Grace et al., "Approaching Quantum Limited Super-Resolution Imaging without Prior Knowledge of the Object Location", Aug. 6, 2019, Journal of the Optical Society of America A, vol. 37 (Year: 2019).*
(Continued)

*Primary Examiner* — Chan S Park
*Assistant Examiner* — Daniel C Chang
(74) *Attorney, Agent, or Firm* — Cozen O'Connor

(57) ABSTRACT

Imaging a distribution of one or more optical sources includes: receiving respective optical signals from a spatial mode sorter during each of two or more detection intervals of time; after each of the two or more detection intervals of time, processing information based at least in part on: (1) the respective optical signal received in the corresponding detection interval of time, and (2) a first set of models comprising a set of distributions related to one or more optical sources, each model corresponding to a different number of optical sources in the distribution, and configuring the spatial mode sorter based at least in part on the processing; and providing an estimated measurement characterizing the distribution of one or more optical sources
(Continued)

200 based at least in part on the processed information. The processing after at least one of the two or more detection intervals of time includes computing an eigen-projection.

19 Claims, 12 Drawing Sheets

(51) Int. Cl.
*G06N 7/01* (2023.01)
*G06N 10/00* (2022.01)

(56) References Cited

U.S. PATENT DOCUMENTS

2020/0027325 A1 1/2020 Mori et al.
2021/0033640 A1 2/2021 Guha et al.

OTHER PUBLICATIONS

Dutton et al., "Attaining the quantum limit of superresolution in imaging an object's length via predetection spatial-mode sorting", Mar. 25, 2019, Physical Review A 99, 033847 (Year: 2019).*
Tsang et al., "Quantum Theory of Superresolution for Two Incoherent Optical Point Sources", Aug. 29, 2016, Physical Review X 6, 031033 (Year: 2016).*
Defienne "Arbitrary spatial mode sorting in a multimode fiber" Web, pp. 1-8; Jun. 24, 2020 [retrieved Jul. 31, 2022]. Retrieved from the internet: URL: https://arxiv.org/pdf/2004.05585.pdf.
Dutton. "Attaining the quantum limit of super resolution in imaging an object's lenth via pre-detection spatial mode sorting" Web; pp. 1-8; Jan. 19, 2018 [retrieved Jul. 31, 2022]. Retrieved from the internet: URL: https://arxiv.org/abs/1801.06602.
Z. Huang et al., "Quantum Hypothesis Testing for Exoplanet Detection", Phys. Rev. Lett., vol. 127, Iss. 13, pp. 1-6, Sep. 23, 2021, DOI: 10.1103/PhysRevLett.127.130502.
F. Bao et al., "Quantum-accelerated imaging of N stars", Optics Letters, vol. 46, No. 13, pp. 1-12, May 4, 2021, DOI: 10.1364/ol.430404.
M. R. Grace et al., "Approaching quantum-limited imaging resolution without prior knowledge of the object location," J. Opt. Soc. Am. A, vol. 37, No. 8, pp. 1288-1299, 2020, DOI: 10.1364/JOSAA.392116.
X-M Lu et al., "Quantum-optimal detection of one-versus-two incoherent optical sources with arbitrary separation", npj Quantum Inf, vol. 4, Dec. 7, 2018, DOI: 10.1038/s41534-018-0114-y.
Almeida et al., "Discrimination and estimation of incoherent sources under misalignment", American Physical Society, Phys. Rev. A, vol. 103, Issue 2, pp. 1-15, Feb. 8, 2021, DOI: 10.1103/PhysRevA.103.022406.
Boucher et al., "Spatial optical mode demultiplexing as a practical tool for optimal transverse distance estimation", Optical Society of America, vol. 7, No. 11, pp. 1621-1626, Nov. 18, 2020, DOI: 10.1364/OPTICA.404746.
Kerviche et al., "Fundamental limit of resolving two point sources limited by an arbitrary point spread function", arXiv, physics.optics, pp. 1-8, Jan. 18, 2017, DOI: 10.48550/arXiv.1701.04913.
Kodinariya et al., "Review on Determining of Cluster in K-means Clustering", International Journal of Advance Research in Computer Science and Management Studies, vol. 1, Issue 6, pp. 90-95, Nov. 2013, ISSN: 2321-7782.
Liu et al., "Quantum Fisher information matrix and multiparameter estimation", J. Phys. A: Math. Theor. 53 023001, pp. 1-69, Dec. 18, 2019, DOI 10.1088/1751-8121/ab5d4d.
Nair et al., "Interferometric superlocalization of two incoherent optical point sources", Opt. Express, vol. 24, No. 4, pp. 3684-3701, Feb. 12, 2016, DOI:10.1364/OE.24.003684.
Paúr et al., "Reading out Fisher information from the zeros of the point spread function", Opt. Lett., vol. 44, No. 12, pp. 3114-3117, Jun. 2019, DOI: 10.1364/OL.44.003114.
Pirandola et al., "Computable bounds for the discrimination of Gaussian states", Phys. Rev. A, vol. 78, pp. 1-8, Jul. 2008, DOI: 10.1103/PhysRevA.78.012331.
William Hadley Richardson, "Bayesian-Based Iterative Method of Image Restoration*", J. Opt. Soc. Am., vol. 62, No. 1, pp. 55-59, Jan. 1972, DOI: 10.1364/JOSA.62.000055.
Sajjad et al., "Attaining quantum limited precision of localizing an object in passive imaging", Phys. Rev. A, pp. 1-19, Mar. 10, 2021, DOI: 10.1103/PhysRevA.104.022410.
Mankei Tsang, "Subdiffraction incoherent optical imaging via spatial-mode demultiplexing: Semiclassical treatment", Phys. Rev. A, pp. 1-20, Feb. 21, 2018, DOI: 10.1103/PhysRevA.97.023830.
Tsang et al., "Quantum Theory of Superresolution for Two Incoherent Optical Point Sources", Phys. Rev. X, vol. 6, Iss. 3, pp. 1-17, Aug. 29, 2016, DOI: 10.1103/PhysRevX.6.031033.
Zhang et al., "Super-resolution optical classifier with high photon efficiency", Opt. Lett., vol. 45, No. 18, pp. 4968-4971, Sep. 15, 2020, DOI: 10.1364/OL.401614.
Redmon, J et al. "You Only Look Once: Unified, Real-Time Object Detection". White Paper. [online], May 9, 2016; ArXiv; [Retrieved on Jul. 23, 2022]. Retrieved from the internet: <uri:https://arxiv.org/abs/1506.02640>; abstract; pp. 1-3.
Fontaine, N et al. "Laguerre-Guassian Mode Sorter" vol. 10. Nature Communications. Online. Apr. 26, 2019; Entire Document; DOI: 10.1038/s41467-019-09840-4.
Fickler, R et al. "Custom-tailored spatial mode sorting by controlled random scattering" vol. 95, 161108. Phys. Rev. B. Online. Jan. 20, 2017; Entire Document; DOI: 10.1103/PhysRevB.95.161108.

* cited by examiner

MANAGING ADAPTIVE MEASUREMENT FOR HIGH-RESOLUTION MEASUREMENT

CROSS-REFERENCE TO RELATED APPLICATION(S)

This application claims priority to and the benefit of U.S. Provisional Application Patent Ser. No. 63/186,018, entitled "MANAGING ADAPTIVE MEASUREMENT FOR HIGH-RESOLUTION IMAGING," filed May 7, 2021 the entire disclosure of which is hereby incorporated by reference.

STATEMENT AS TO FEDERALLY SPONSORED RESEARCH

This invention was made with government support under Grant No. W911NF-20-1-0039, awarded by ARMY/ARO, and Grant No. HR0011-20-9-0128, awarded by DARPA. The government has certain rights in the invention.

TECHNICAL FIELD

This disclosure relates to managing adaptive measurement for high-resolution measurement.

BACKGROUND

Some passive imaging architectures employ a digital focal plane followed by electronic-domain post-processing. However, this approach can be inefficient, especially for resolving features with extent smaller than the Rayleigh diffraction limit. Using quantum information theory, suitable spatial modal measurement(s) can significantly outperform the traditional diffraction-limited imaging for estimating two sub-Rayleigh spaced incoherent point sources (e.g., below the diffraction limit).

SUMMARY

In one aspect, in general, a method for imaging a distribution of one or more optical sources includes: receiving respective optical signals from a spatial mode sorter during each of two or more detection intervals of time; after each of the two or more detection intervals of time, processing information based at least in part on: (1) the respective optical signal received in the corresponding detection interval of time, and (2) a first set of models comprising a set of distributions related to one or more optical sources, each model corresponding to a different number of optical sources in the distribution, and configuring the spatial mode sorter based at least in part on the processing; and providing an estimated measurement characterizing the distribution of one or more optical sources based at least in part on the processed information. The processing after at least one of the two or more detection intervals of time includes computing an eigen-projection.

Aspects can include one or more of the following features.

The configuring after each of the two or more detection intervals of time configures the spatial mode sorter to project the respective optical signals onto a basis of the computed eigen-projection.

The first set of models includes a set of spatial distributions for the optical sources.

The first set of models further includes a set of Bayesian prior probability distributions for the set of spatial distributions.

The set of Bayesian prior probability distributions for the set of spatial distributions includes a set of Gaussian distributions.

A set of hyper-parameters for the Gaussian distributions are based at least in part on a result of an expectation maximization calculation that is based at least in part on the processed information.

The first set of models includes a set of brightness distributions for the optical sources.

The first set of models further includes a set of Bayesian prior probability distributions for the set of brightness distributions.

The set of Bayesian prior probability distributions for the set of brightness distributions includes a set of Dirichlet distributions.

A set of hyper-parameters for the Dirichlet distribution is based at least in part on a result of an expectation maximization calculation that is based at least in part on the processed information.

The eigen-projection is the eigenvectors of a symmetric logarithmic derivative operator.

The symmetric logarithmic derivative operator is based at least in part on a set of one or more operators constructed from a single-parameter inference setting.

The eigen-projection is the eigenvectors of an operator constructed from a Bayesian inference setting.

The operator constructed front a Bayesian inference setting is based at least in part on a set of one or more operators constructed from a single-parameter Bayesian inference setting.

The eigen-projection comprises a Personick eigen-projection.

The processed information includes a second set of models.

The second set of models comprising a second set of distributions related to one or more optical sources, determined by (1) the first set of distributions related to one or more optical sources and (2) respective optical signals received in a previous detection interval of time.

The processing after at least one of the two or more detection intervals of time includes computing a quantum Fisher information matrix associated with the respective optical signals.

The processing after at least one of the two or more detection intervals of time includes computing a modified quantum Fisher information matrix derived in a Bayesian inference setting and associated with the respective optical signals.

In another aspect, in general, one or more non-transitory computer-readable media, having instructions stored thereon that, when executed by a computer system, cause the computer system to perform operations including: receiving respective optical signals from a spatial mode sorter during each of two or more detection intervals of time; after each of the two or more detection intervals of time, processing information based at least in part on: (1) the respective optical signal received in the corresponding detection interval of time, and (2) a first set of models comprising set of distributions related to one or more optical sources, each model corresponding to a different number of optical sources in the distribution, and configuring the spatial mode sorter based at least in part on the processing; and providing an estimated measurement characterizing the distribution of one or more optical sources based at least in part on the processed information. The processing after at least one of the two or more detection intervals of time includes computing an eigen-projection.

In another aspect, in general, an apparatus for imaging a distribution of one or more optical sources includes: a spatial mode sorter that defines a configurable basis comprising a set of spatial modes onto which an coming optical signal is projected; and a control module. The control module is configured to: receive respective optical signals from the spatial mode sorter during each of two or more detection intervals of time; after each of the two or more detection intervals of time, process information based at least in part on: (1) the respective optical signal received in the corresponding detection interval of time, and (2) a first set of models comprising a set of distributions related to one or more optical sources, each mod& corresponding to a different number of optical sources in the distribution, and configure the spatial mode sorter based at least in part on the processing; and provide an estimated measurement characterizing the distribution of one or more optical sources based at least in part on the processed information. The processing after at least one of the two or more detection intervals of time includes computing an eigen-projection.

Aspects can have one or more of the following advantages.

Some of the techniques described herein use an eigen-projection adaptive algorithm for super-resolution imaging. For example, an adaptive measurement scheme can resolve point-source constellations with sub-Rayleigh separations by employing certain modal measurements. The measurements can be performed using classical measurement techniques, but may be based on certain aspects of quantum estimation theory (e.g., quantum-inspired optical super-resolution adaptive imaging). These measurement techniques can achieve increased performance, as described in more detail below.

Other features and advantages will become apparent from the following description, and from the figures and claims.

BRIEF DESCRIPTION OF THE DRAWINGS

The disclosure is best understood from the following detailed description when read in conjunction with the accompanying drawing. It is emphasized that, according to common practice, the various features of the drawing are not to-scale. On the contrary, the dimensions of the various features are arbitrarily expanded or educed for clarity.

DETAILED DESCRIPTION

A measurement method is designed to enhance the performance of estimating the brightness and location of incoherent point sources, including resolving the point pairs which are in the sub-Rayleigh regime, in a constellation through the light collected by incoherent imaging systems like microscopes or telescopes. In some implementations, the design is based on the fact that for a single parameter estimation problem, the eigen-projection measurement of the symmetric logarithmic derivative (SLD) operator achieves the quantum Fisher information (QFI) limit. For the 3N parameters (N for brightness and 2N for the location on the 2D focal plane) of a N-point constellation, the eigenvector with the largest eigenvalue of the current state of estimation is identified as the single parameter and a set SLD eigen-projection is constructed for the measurement of the next stage. Other implementations are based on another type of eigen-projection measurement, as described in more detail below.

One example of the algorithm includes two main stages: initialization, and SLD eigen-projection. In this example, in the initialization stage, direct imaging measurement with an expectation maximization (EM) algorithm is used to get a set of pre-estimation for the 3N parameters. Based on the pre-estimation, a set of density operators can be created using the grouping algorithm and the density operators are carried to the next stage of measurement. The initialization stage can be performed as described herein, or by any technique that provides a suitable pre-estimation. In the SLD eigen-projection stage, the adaptive measurement is divided into different cycles. In each cycle, a density operator is selected from the pool of models and the QFI matrix of that operator is calculated. The eigenvector with the largest eigenvalue is selected as the single parameter which is used for the construction of the SLD eigen-projection measurement. A certain amount of photons from the incoherent sources are measured in the spatial modes given by the eigen-projection of SLD. The density operators are updated under the Bayesian framework and one of them is selected according to their likelihood for the next cycle. When photons are exhausted, the parameters in the density operator being picked is used as the final estimation. Other techniques can be used to select the density operator and the parameter. The selection schemes may be task specific.

Figure 1:
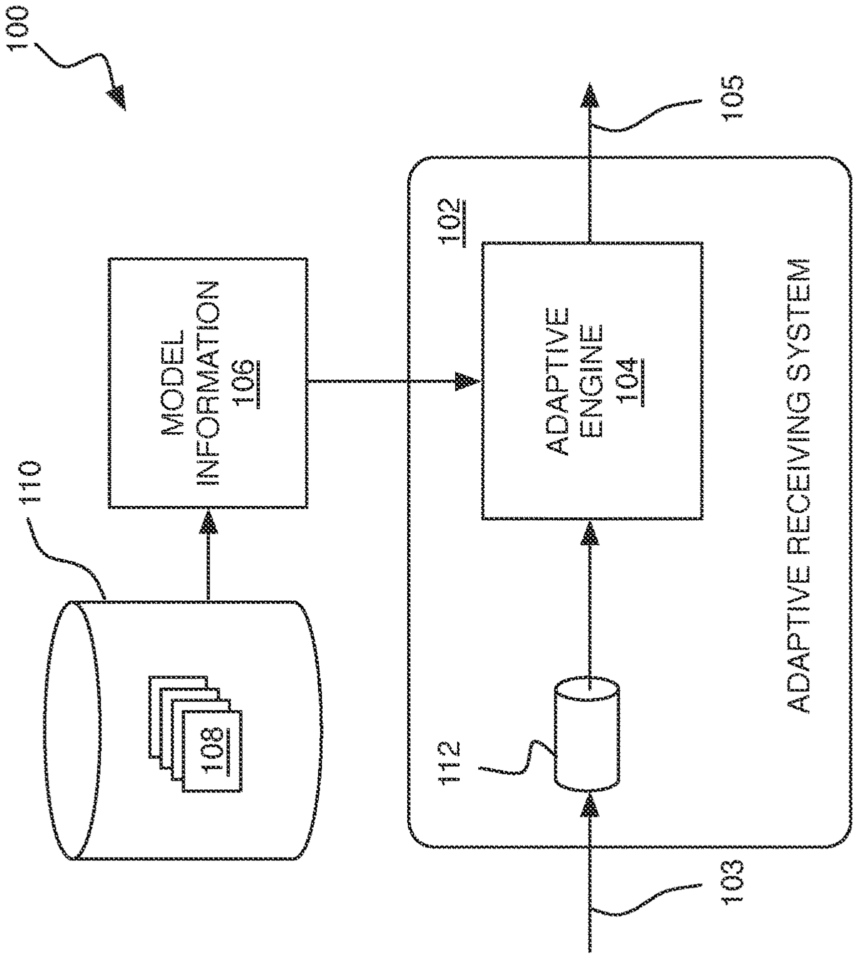
FIG. 1 is a schematic diagram of an example adaptive measurement system.

Referring to FIG. 1, an example of a measurement system 100 includes an adaptive receiving system 102 that includes an adaptive engine 104 (e.g., including an optical front-end and a processing module implemented on a special-purpose or general-purpose processor) for receiving an optical input 103 and producing measurement information 105 as output. The adaptive engine 104 receives model information 106 defining multiple models for a potential distribution of optical sources to be imaged. For example, a set of models 108 are stored in a storage system 110. Between a series of detection intervals of time, the adaptive engine 104 configures a configurable spatial mode sorter 112 to provide optical signals that change based at least in part on the adaptive computations being performed, as described in more detail herein. Examples of some aspects of this part of the procedure (e.g., spatial-mode sorting) are described in more detail below.

Without intending to be bound by theory, simulation has been done to compare the performance of this scheme against a traditional diffraction limited direct imaging under different metrics. The result shows that for the Jaccard index metrics, which calculate the Jaccard index for the point sources together with RMSE for the parameters, and the pseudo-imaging metrics, which calculate the overlapping integral of the image given by the ground truth of the scene and the estimated scene through a pseudo-aperture, the SLD eigen-projection outperforms the traditional method.

Figure 2:
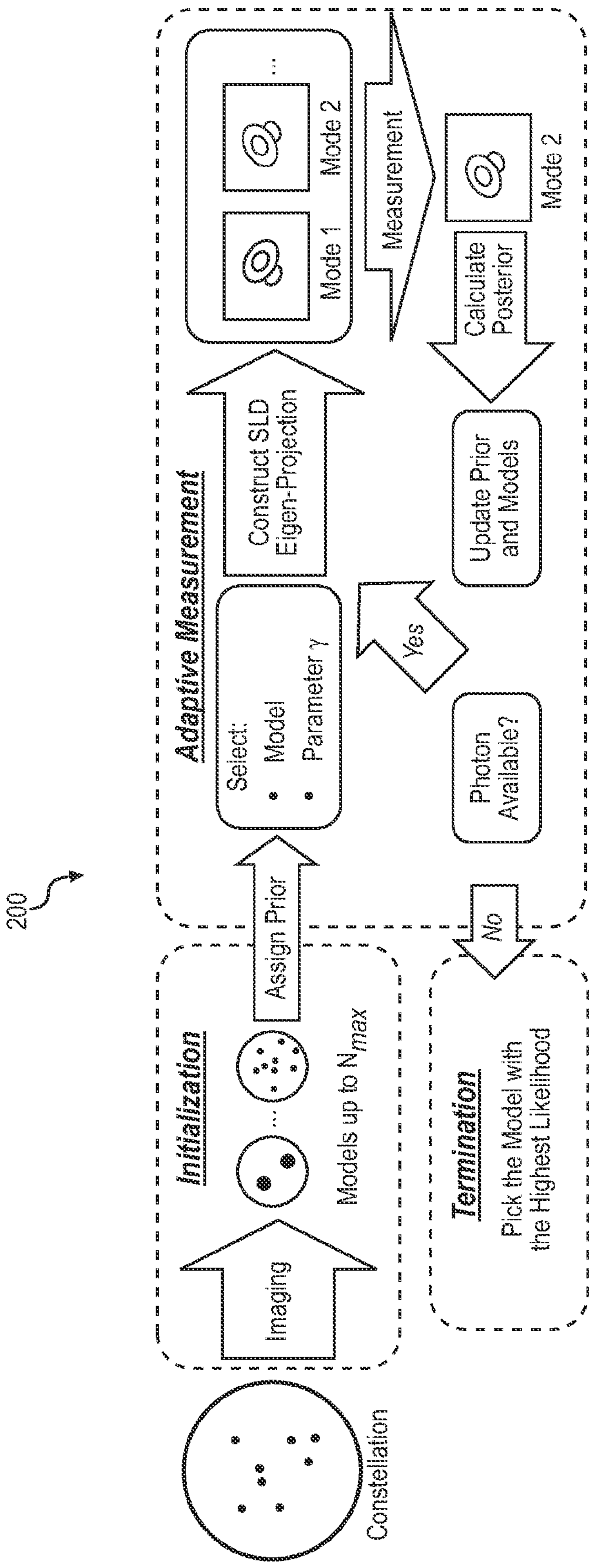
FIG. 2 is a schematic diagram of an example adaptive measurement procedure.

FIG. 2 shows an example of an adaptive measurement procedure 200. Given a constellation composed of point-sources as shown in the upper left of FIG. 2, an example of imaging problem can be stated as estimating: 1) the number of point sources, 2) their relative brightness and 3) positions, given prior information on the maximum number of point sources $P_{max}$. In some implementations, a goal is to resolve all point sources at all separations including those in sub-Rayleigh regime (super-resolution problem). We employ a diffraction-limited lens with a Gaussian aperture, and propose an adaptive modal projection measurement scheme. The adaptive scheme includes three stages: initial measurement (initialization), adaptive measurements and termination.

At a high level, the adaptive measurement procedure 200 images a constellation of an unknown number of point sources acid constructs a model for the location of the point sources, with one model for each possible number of point sources in the constellation. The number of point sources may be bounded by prior knowledge. A projective measurement is constructed from the model and the constellation is further imaged. The additional information from the imaging is then used to update each model. This process can be iterated multiple times until a goal is reached (e.g., until no further imaging is allowed), after which the model with the highest likelihood is used and an estimate for the number of point sources and their locations is determined.

In the initialization stage, we allocate a pre-defined number of photons to a traditional imaging measurement. An initial estimate of the constellation parameters is obtained using this imaging measurement using the expectation maximization (EM) algorithm. Based on the estimated parameters and a grouping algorithm we have developed, we construct a set of models of the constellation with varying number of point sources ranging from NEM, number of point sources estimated by the EM algorithm, to $P_{max}$. Each model is represented by a density operator with incoherent mixture of spatial coherent states. For each model, a prior distribution is assigned to each position and brightness parameter.

Modal projection measurements are performed in the next stage. In some implementations, the design of the modal basis is based on the fact that for a single parameter problem, the eigen-projection of the symmetric logarithmic derivative (SLD) operator achieves the quantum limit. However, the problem here is a multi-parameter problem and furthermore the SLD eigen-projection is parameter dependent. Thus, the system first selects a model with the highest likelihood given the photons collected so far. Next, the system calculates the quantum Fisher information (QFI) matrix for that model (parameters) and pick the eigenvector with highest eigenvalue as the hypothetical parameter $\gamma$ that is used to construct the SLD operator. Measuring the photons using the SLD eigen-projection of $\gamma$, the posterior is updated and serves as the prior for the next measurement. The measurement scheme terminated when the photon/exposure time budget is exhausted and the model with highest likelihood is selected.

Figure 3B:
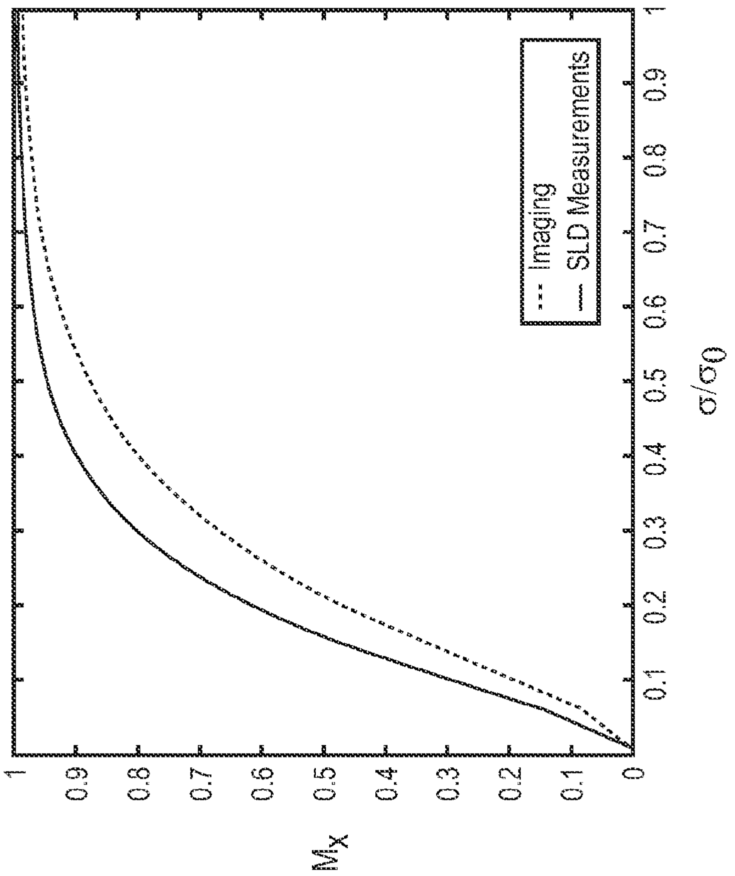
FIG. 3A and FIG. 3B are plots of example point source locations and a pseudo-imaging metric, respectively.
Figure 3A:
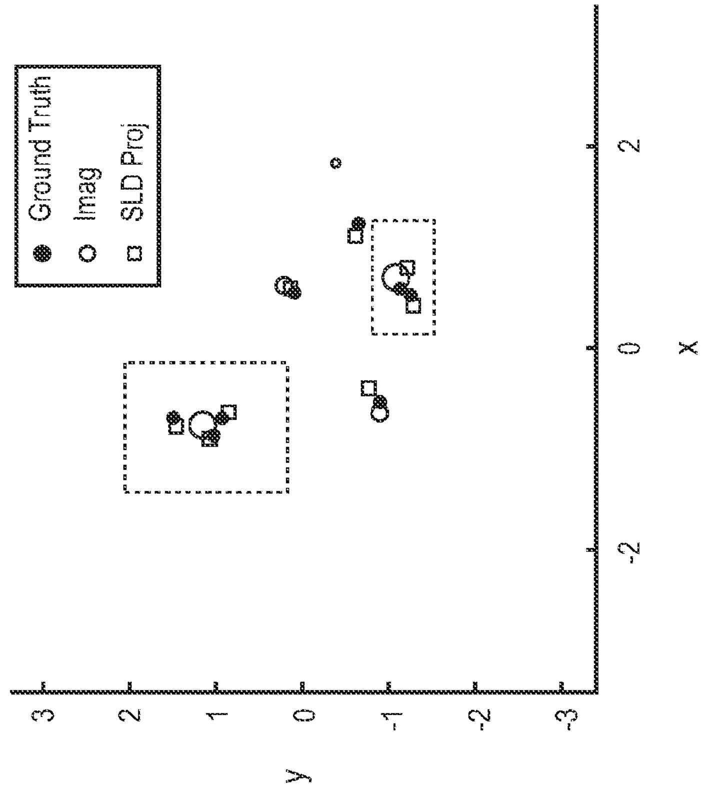

Referring to FIG. 3A, we use an example with 8 point sources to demonstrate the performance of an example adaptive measurement scheme. The point sources are generated (uniformly) within a 3 RL (Rayleigh length)×3 RL square field of view with relative brightnesses following a uniform distribution. The maximum number of point sources $P_{max}$ is set 10 and the total photon budget is 10000. The SLD eigen-projection measurement is initialized by using 500 photons on an imaging measurement followed by EM algorithm to estimate the initial parameters. The remaining 9500 photons are detected by the sequentially adaptive SLD eigen-projection measurements. For some imaging implementations, the system uses an EM algorithm for estimating the constellation. We observe that for sub-Rayleigh separated point sources (dashed box), the SLD eigen-projection measurements are able to resolve the sources while the imaging aggregates them as a single source.

FIG. 3B shows the resulting imaging performance evaluation using a metric/score $M_x$ defined as:

$$M_X(\sigma) = \int \sqrt{I(\theta;\sigma)I(\hat{\theta};\sigma)}\,d\vec{r},$$

where $\theta$ is the true parameter value, $\hat{\theta}$ is the estimated parameter value and $\sigma$ is the width of the pseudo-PSF.

This imaging metric measures the overlapping integral of the pseudo-intensity distribution $I(\theta, \sigma)$ for true and estimated parameters. In this example, the intensity distribution can be defined as super-position of intensity of point sources blurred by a Gaussian PSF (with width $\sigma$). As $\sigma$ decreases the imaging metric becomes more sensitive, while its overall magnitude also decreases. In this prophetic example, the system averages around 900 constellations at different $\sigma$, where $P_{max}$=10 and the true number of point sources P ranging from 5 to 10. We can see that the SLD eigen-projection measurement (upper line) outperforms the imaging (lower line) for all $\sigma$.

These results show that the proposed adaptive imaging scheme is capable of optical super-resolution even in the noise-limited regime. Implementations of such a scheme have potential applications in space surveillance, astronomy, and biological imaging (fluorescent microscopy).

Figure 4:
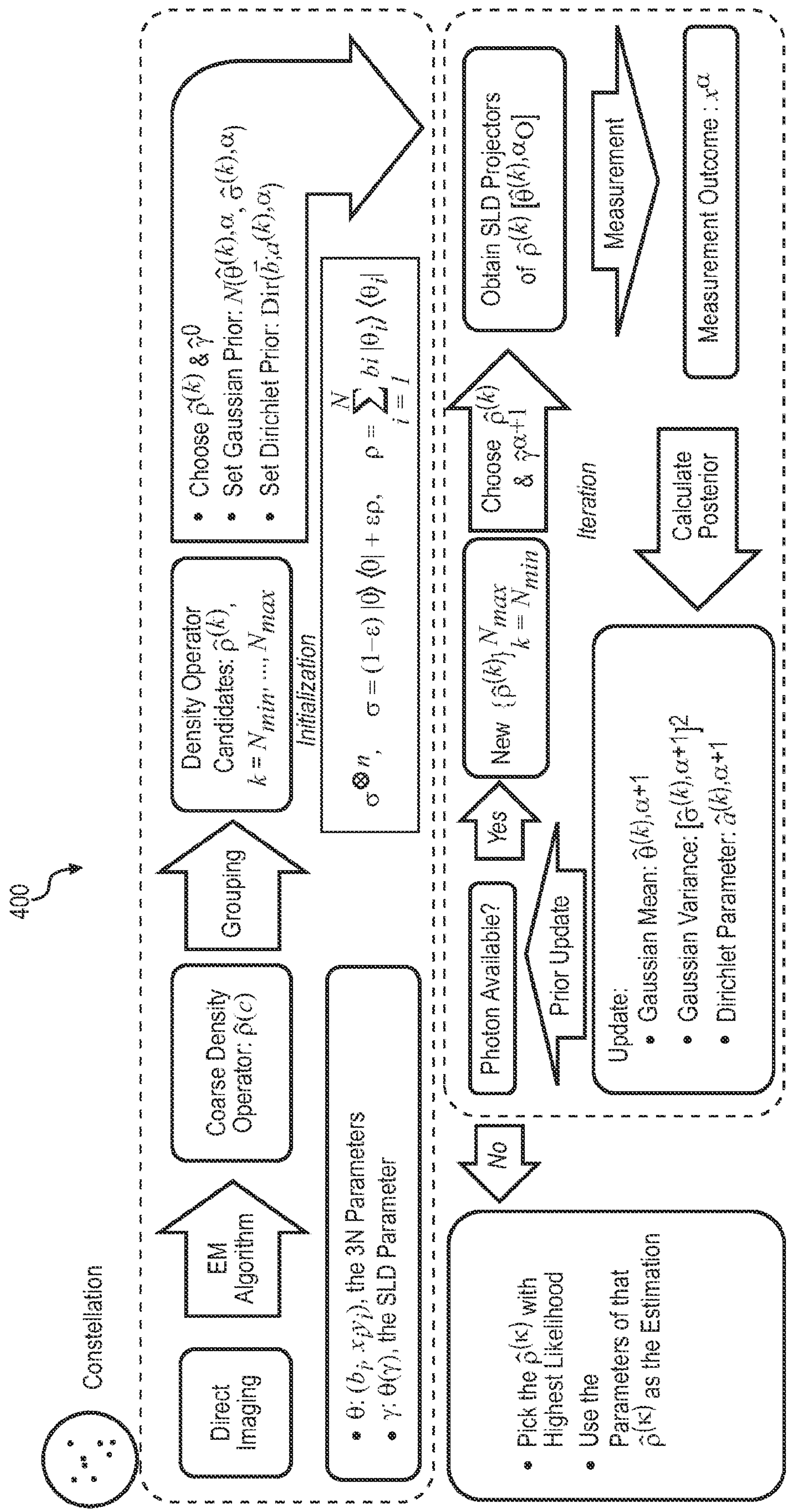
FIG. 4 is a schematic diagram of an example SLD approach.

A variety of implementations of the approach described herein can be used. FIG. 4 shows a high level summary 400 of some such implementations. Other implementations are also possible.

In Bayesian estimation theory the estimator $\hat{\theta}=E[\theta|l]$ attains the minimum mean squared error (MMSE) for estimating a scalar parameter of interest $\theta$ from the observation of l through a noisy channel $P_{l|\theta}$, given a prior $P_\theta$ on $\theta$. In quantum, e.g., optical and atomic, sensing tasks the user gets $\rho_\theta$, the quantum state that encodes $\theta$. The user chooses a measurement, a positive-operator valued measure (POVM) $\Pi_l$, which induces the channel $P_{l|\theta}=\mathrm{Tr}(\rho_\theta\Pi_l)$ to the measurement outcome l, on which the aforesaid classical MMSE estimator is employed. There exists an optimum POVM $\Pi_l$ that minimizes the MMSE over all possible measurements, and the corresponding MMSE. This result is an alternative to the quantum Fisher information (QFI), which lower bounds the variance of an unbiased estimator over all measurements, when $P_\theta$ is unavailable. For multi-parameter estimation, i.e., when θ is a vector, in Fisher quantum estimation theory, the inverse of the QFI matrix provides an operator lower bound to the covariance of an unbiased estimator. However, there has been little work on quantifying quantum limits and measurement designs for multi-parameter quantum estimation in the Bayesian setting.

Some implementations build upon this result to construct a Bayesian adaptive measurement scheme for multi-parameter estimation when P copies of $\rho_\theta$ are available. We illustrate an application to localizing a cluster of point emitters in a highly sub-Rayleigh angular field-of-view, an important problem in fluorescence microscopy and astronomy. An example algorithm translates to a multi-spatial-mode transformation prior to a photon-detection array, with electro-optic feedback to adapt the mode sorter. We show that this receiver outperforms quantum-noise-limited focal-plane direct imaging.

Without intending to be bound by theory, an example of a sensing and imaging measurement design problem can be abstracted to having access to an P-copy quantum state $\rho(\theta)^{\otimes N}$ encoding M parameters of interest, denoted by the vector $\theta=[\theta_1, \theta_2, \ldots, \theta_M]^T$. The receiver realizes a quantum measurement, described by a positive-operator-valued measure (POVM) $\{\Pi_l\}$, operating on a single copy of $\rho(\theta)$, resulting in a vector-valued measurement outcome $l=[l_1, l_2, \ldots, l_N]^T$. The choice of a POVM induces the (classical') measurement channel defined by the probability density $p(l|\theta)=\mathrm{Tr}(\rho(\theta)\Pi_l)$. When more than one copy of the quantum state is available (N≥2), the receiver can: (1) in the most general setting choose a joint-measurement POVM $\{\Pi_{l_{(N)}}\}$ acting collectively on $\rho(\theta)^{\otimes N}$, producing the outcome $l_{(N)}$: (2) employ the so-called local operations and classical communications (LOCC) scheme, where each copy of the state is measured by an independent measurement, where the $$POVM\left\{\prod\nolimits_l^{\tau}\right\}$$

acting on the $\tau^{th}$ copy of $\rho(\theta)$ is chosen based on the information available from the previous set of measurement outcomes $\{l^{(1)}, l^{(2)}, \ldots, l^{(\tau-1)}\}$, $1\le\tau\le N$; or (3) use independent identical measurements on each copy of the state, described by the POVM $\{\Pi_l\}$. No matter which strategy the receiver may use, after measuring all P copies, the receiver generates an estimate of θ, i.e., $\hat{\theta}(l_{set})$ where $l_{set}=l_{(N)}$ for case (1) above, and $l_{set}=[l^{(1)}, l^{(2)}, \ldots, l^{(N)}]$ for cases (2) and (3) above. The receiver chooses the estimator to optimize a desired objective/loss function. A natural choice of the objective function associated with sensing and imaging tasks is mean (expected) squared-error (MSE), $E[\|\theta-\hat{\theta}\|^2]$.

For any given measurement POVM $\{\Pi_l\}$, assuming strategy (3) above, i.e., the same measurement acts on each copy of $\rho(\theta)$, the problem reduces to the standard classical estimation theory problem of estimating θ from P i.i.d. samples of l, each produced by $p(l|\theta)$. The covariance $\mathrm{Cov}(\hat{\theta}(l_{set}), \theta)$ for any unbiased estimator $\hat{\theta}$ of θ is lower bounded by $\Sigma_C$. This means $\mathrm{Cov}(\hat{\theta}(l_{set}), \theta)-\Sigma_C$ is a semi-positive definite matrix, denoted compactly as $\mathrm{Cov}(\hat{\theta}(l_{set}),\theta)\ge\Sigma_C$. The receiver's task is to pick the optimal estimator $\hat{\theta}^{opt}(l_{set})$ on the measurement $l_{set}$, such that $\mathrm{Cov}(\hat{\theta}^{opt}(l_{set}), \theta)$ saturates the bound $\Sigma_C$ when permissible.

Tools of quantum estimation theory let us find a tighter lower bound to $\mathrm{Cov}(\hat{\theta}(l), \theta)$, which automatically optimizes over all physically-permissible choices of a POVM $\{\Pi_l\}$ (again, assuming that the same measurement is used to detect each copy of $\rho(\theta)$). The $\mathrm{Cov}(\hat{\theta}(l), \theta)$ is lower bounded by $\Sigma_Q$ (a quantum bound), which itself is an infimum of all bounds $\Sigma_C$ associated with all possible choices of $\{\Pi_l\}$. For certain cases (for example when θ is a single scalar parameter), quantum estimation theory also tells us the optimal receiver $$POVM\left\{\prod\nolimits_l^{(opt)}\right\}.$$

Once the optimal receiver is chosen, it uses the optimal estimator $\hat{\theta}^{opt}(l_{set})$ using standard classical estimation tools, such that $\mathrm{Cov}(\hat{\theta}^{opt}(l_{set}), \theta)$ saturates $\Sigma_Q$ when permissible. In general $\mathrm{Cov}(\hat{\theta}(l_{set}), \theta)\ge\Sigma_C\ge\Sigma_Q$, where $\Sigma_C$ could correspond to any POVM choice.

The aforementioned lower bounds on the covariance of multi-parameter estimators can be defined within the statistical inference frameworks the frequentist, i.e., Fisherian (with no prior), or the Bayesian (with prior p(θ)) inference settings. We review below some known bounds in both the settings.

In the Fisherian (frequentist) framework, when no prior p(θ) is available, the Cramer-Rao lower bound (CRLB) $\Sigma_C$ on the covariance $\mathrm{Cov}(\hat{\theta}(l), \theta)$ of an unbiased estimator is given by the inverse of the Fisher information (FI) matrix I.

$$I_{ij} = \int\left[\frac{\partial}{\partial\theta_i}\ln p(l\mid\theta)\right]\left[\frac{\partial}{\partial\theta_j}\ln p(l\mid\theta)\right]p(l\mid\theta)dl, \tag{1}$$

with I≤(i,j)≤M, and the likelihood $p(l/\theta)=\mathrm{Tr}(\rho(\theta)\Pi_l)$. The quantum version of this lower bound $\Sigma_Q$, which only depends on $\rho(\theta)$ (since the measurement $\Pi_l$ is automatically optimized over) is given by the inverse of the quantum Fisher information (QFI) matrix Q, the elements of which are:

$$Q_{ij} = \frac{1}{2}Tr\left[\rho(\theta)\frac{L_iL_j + L_jL_i}{2}\right], \tag{2}$$

where $L_i$ is the symmetric logarithmic derivative (SLD) operator which can be evaluated from the implicit relationship:

$$2\frac{\partial}{\partial\theta_i}\rho(\theta) = \rho(\theta)L_i + L_i\rho(\theta), \tag{3}$$

with 1≤i≤M. Thus, we have $\mathrm{Cov}(\hat{\theta}(l_{set}), \theta)\ge I^{-1}\ge Q^{-1}$ in the Fisher framework. For N-copy i.i.d. measurement of $\rho(\theta)^{\otimes N}$, both the classical and quantum bounds above are lowered by a factor of 1/N. The classical one is asymptotically attained by the maximum likelihood estimator (NILE). The quantum CRLB $(Q^{-1})$ is not saturable in general for M>1.

Given a prior p(θ) on the pan Teter vector θ, the Bayesian Cramer-Rao lower bound (BCRLB) $\Sigma_C$ is given by:

$$\sum_C = \int p(\theta)\theta\theta^T d\theta - J, \quad (4)$$

where the M-by-M matrix J is defined as:

$$J_{ij} = \int \frac{\left[\int p(l, \theta)\theta_i d\theta\right]\left[\int p(l, \theta)\theta_j d\theta\right]}{p(l)} dl, \quad (5)$$

and p(l, θ)=p(l|θ)p(θ) is the joint distribution of l and θ. For the quantum version of this lower bound, we first define the following operators, for 1≤i≤M and k=0, 1, 2:

$$\Gamma_{i,k} = \int d\theta p(\theta)\rho(\theta)\theta_i^k, \quad (6)$$

and operators $B_i$, l≤i≤M, that satisfy:

$$2\Gamma_{i,1} = \Gamma_0 B_i + B_i \Gamma_0. \quad (7)$$

For k=0, $\Gamma_{i,0}=\Gamma_{j,0}$, ∀(i,j), thus we can drop the first index and denote it as $\Gamma_0=\int d\theta p(\theta)\rho(\theta)$, the average received state. The quantum BCRLB $\Sigma_Q$ can be written as:

$$\sum_Q = \int p(\theta)\theta\theta^T d\theta - G, \quad (8)$$

where $$G_{ij} = \frac{1}{2} Tr\left[\Gamma_0 \frac{B_i B_j + B_j B_i}{2}\right]. \quad (9)$$

Thus in a Bayesian inference framework, we have $Cov(\hat{\theta}(l),\theta)\geq\Sigma_C\geq\Sigma_Q$.

To achieve the quantum bound, an optimal measurement is required (i.e. an optimal choice POVM, that acts on each copy of ρ(θ)). For a single parameter problem (M–1), the projective measurement onto the eigenvectors of the SLD operator L in Eq. (3) saturates the Fisher bound, i.e., the $\Sigma_C$ for the SLD measurement equals $\Sigma_Q$. Likewise, the Bayesian quantum bound on the covariance is saturated, for the case of a single parameter (M–1) by a projective measurement onto the eigenvectors of the operator B in Eq. (7).

For multi-parameter estimation, if the operators associated with parameter $\theta_i$: $L_i$ and $B_i$, 1≤i≤M commute with one another, for the Fisher and Bayesian frameworks respectively, the corresponding covariance bound can be saturated by the above-said measurements, calculated by evaluating the eigenvectors of $L_i$ or $B_i$, respectively (which i does not matter as they are simultaneously diagonal). However, if the operators do not commute, which is the case in general, a measurement that is jointly optimal for all parameters may not exist and is likely to be challenging to derive.

In the quantum case, the Holevo Cramer-Rao bound (HCRB) is the most fundamental scalar lower bound on the weighted mean square error $Tr(WCov(\hat{\theta}, \theta))$, for a positive definite W. The HCRB represents the best precision attainable with a collective measurement (discussed as case (1) above) on an asymptotically large number of identical copies of ρ(θ).

We propose a sequential adaptive measurement scheme (an LOCC) within a full Bayesian inference framework. We leverage tools from Bayesian quantum estimation theory. In one example, we employ our measurement scheme to the problem of localizing an unknown number of point-emitters placed in a sub-Rayleigh (below diffraction-limit) field of view in an optical imaging context. This application is motivated by the fact that traditional direct focal-plane imaging, which employs intensity measurements followed by electronic-domain processing, is known to be highly sub-optimal in the sub-Rayleigh regime. We compare our quantum-inspired adaptive sequential measurement design with the direct imaging technique to quantify the significant performance improvement in optical resolution achieved by our scheme.

Consider a system in the state described by the density operator:

$$\rho'(\theta) = \sum_{i=1}^{P} b_i(\theta)|\psi_i(\theta)\rangle\langle\psi_i(\theta)|, \quad (10)$$

where $\theta=[\theta_1, \theta_2, \ldots, \theta_M]^T$ are the parameters of interest, $|\Psi_i(\theta)\rangle$ and $b_i(\theta)$ are the parameter-dependent pure states and the corresponding weights respectively. P itself, in general, is an unknown parameter (positive integer) such that: $P_{min}\leq P\leq P_{max}$. Here we assume that P is upper bounded by $P_{max}$, i.e., a prior on P. If the lower bound $P_{min}$ is not known/available, we can set it to 1. When $P_{min}\neq P_{max}$, both P and θ parameters need to be estimated. On the contrary, if $P_{min}=P=P_{max}$, i.e., P is known a priori exactly and we only need estimate the parameters θ.

A single copy of a quantum state ρ'(θ), defined in Eq. (10), can be measured with a POVM $\{\Pi_l\}$ such that the probability of getting a scalar outcome l is $p(l|\theta)=Tr[\rho'(\theta)\Pi_l]$. Now, let K denote the block-length (of copies of ρ'(θ)) over which the measurement $\Pi_l$ stays the same. The density operator $\rho(\theta)=\rho'(\theta)^{\otimes K}$ and the probability of observing the measurement outcome $$l = l_1, l_2, \ldots, l_K]^T \text{ is } p(l|\theta) = Tr\left[\rho(\theta)\prod\nolimits_l\right] = \prod\nolimits_{i=1}^K Tr\left[\rho'(\theta)\prod\nolimits_{l_i}\right],$$

where $\Pi_l \triangleq \Pi_{l_1} \otimes \ldots \otimes \Pi_{l_K}$.

To illustrate the proposed scheme, we begin with the P known exactly case. An extension where we relax this prior on P is discussed in the next section. Let us take N=K×S to be the total number of copies of ρ'(θ) available to us. We adapt the measurement choice S times, denoted by τ as the iteration index, 1≤τ≤S. Thus, at the $\tau^{th}$ iteration of the sequential measurement, a single copy of ρ(θ) is measured with the $$POVM\left\{\prod\nolimits_l^{(\tau)}\right\}$$

yielding the outcome vector $$l^{(\tau)} = \left[l_1^{(\tau)}, l_2^{(\tau)}, \ldots, l_K^{(\tau)}\right]^T.$$

At the end of the sequential measurement scheme, a S-copy state $\rho(\theta)^{\otimes S}$ has been measured. The parameter estimate $\hat{\theta}^{(\tau)}$, after the $\tau^{th}$ sequential measurement is denoted by $$\hat{\theta}^{(\tau)} = \left[\hat{\theta}_1^{(\tau)}, \hat{\theta}_2^{(\tau)}, \ldots, \hat{\theta}_M^{(\tau)}\right]^T.$$

In a Bayesian inference setting, the parameter estimate $\hat{\theta}^{(\tau)}$ is given by posterior mean: $\hat{\theta}^{(\tau)}=E_{\theta^{(\tau)}}[p(\theta^{(\tau)}|l^{(\tau)})]$. The posterior $p(\theta^{(\tau)}|l^{(\tau)})=p(l^{(\tau)}|\theta^{\tau-1)})\cdot p(\theta^{(\tau-1)})/p(l^{(\tau)})$, where $p(\theta|l^{(\tau-1)})$ at the previous $\tau^{th}$ iteration. Note that this prior $p(\theta^{\tau-1)})$ in turn equals the posterior $p(\theta)|l^{(\tau-1)})$ at the previous $\tau-1^{th}$ iteration, terminating at $p(\theta^{(1)})=p(\theta)$. The density operator at the $\tau^{th}$ iteration is represented as $\rho(\theta^{(\tau)})$. Now what remains to be determined is how we choose the $$POVM\left\{\prod_l^{(\tau)}\right\}$$

at the $\tau^{th}$ iteration.

It is known that for a single parameter estimation problem, the eigen-projection measurement of $B_1$ in Eq. (7) saturates the quantum bound $\Sigma_Q$, which reduces to a lower bound of the variance of the scalar parameter. The minimum mean square error (MMSE) is given by $\Sigma_Q=\mathrm{Tr}[\Gamma_{1,2}-B_1\Gamma_{1,1}]$, where $\Gamma_{i,j}$ are defined in Eq. (6). We refer to this measurement as the Personick projection in this work. For the multi-parameter problem, the counter-part of $\mathrm{Tr}[B_1\Gamma_{1,1}]$ is a matrix G in Eq. (9). If all $B_i$ operators commute, the quantum optimal measurement is given by the eigen-projections onto any of the $B_i$ operators, however, there is no such guarantee that the optimal measurement for all parameters exists or can be found. At the $\tau^{th}$ iteration of sequential measurement we propose to use a single parameter $\gamma^{(\tau)}$, defined as a linear combination of the M parameters given by the the eigenvector of the matrix G with the smallest eigenvalue. Note that this matrix G is defined per Eq. (9) for the density operator $\rho(\hat{\theta}^{(\tau-1)})$. The scalar parameter $\gamma^{(\tau)}$ is used to construct the operator $B_{\gamma(\tau)}$. The corresponding Personick projection constructed using $B_{\gamma(\tau)}$ is chosen as the $$POVM\left\{\prod_l^{(\tau)}\right\}$$

at the $\tau^{th}$ iteration. The sequential measurements are terminated when we have used all the P available copies of $\rho'(\theta)$.

If the scalar P in Eq. (10) is unknown, we can employ and initialize multiple models of density operators $\rho(\theta_P)$ with the corresponding prior $p(\theta_P;)$, where $\theta_P=[\theta_1, \theta_2, \ldots, \theta_{M_P}]^T$ for $P_{min}\leq P\leq P_{max}$. In such a scenario, the number of parameters $M_P$ for each model corresponding to a P can be different in general. In $\tau^{th}$ iteration of the sequential measurement, one mod& is selected and used to construct the Personick measurement. After model selection, the measurement scheme defined in the previous section can be applied. Note that at $\tau^{th}$ iteration, not only selected model but all the models are updated using the measurement outcome $l^{(\tau)}$. When the sequential measurements eventually terminate, we pick a model using same model selection criteria described above and compute the final multi-parameter estimate as the posterior mean.

We apply an adaptive sequential measurement scheme to estimate the location d relative brightness of incoherent point emitters in a cluster/constellation. The quantum state of photons incident on the image plane through a simple lens is given by the density operator $\rho_{full}$:

$$\rho_{full} = (1-\varepsilon)|0\rangle\langle 0| + \varepsilon\rho' + O(\varepsilon^2), \tag{11}$$

where $|0\rangle$ is the vacuum state, $\rho'$ is the single photon state density operator, which has the form of Eq. (10), and $\varepsilon$ is the total number of photons arriving on the image plane within the coherence time of the source. Assuming that $\varepsilon\leq\leq 1$ (valid for weak thermal source), the photon states with order $O(\varepsilon^2)$ are negligible. As the vacuum state $|0\rangle$ provides no information, we can focus on $\rho'$. Thus, the components of Eq. (10) have the following meaning: P is the number of emitters, $$\{b_i\}_{i=1}^P$$

are the relative brightness of each source (sum normalized to 1) and the states $|\psi_i\rangle$ are given by:

$$|\psi_i\rangle = \int_{-\infty}^{\infty}\int_{-\infty}^{\infty} \psi(x-x_i, y-y_i)|x, y\rangle dx dy, \tag{12}$$

such that $(x_i, y_i)$ are the scaled coordinates of the $i^{th}$ point source on e image plane. The point spread function (PSF) $\psi(x,y)$ of the system is set to a 2D Gaussian function:

$$\psi(x, y) = \frac{1}{\sqrt{2\pi\sigma_x\sigma_y}}\exp\left(-\frac{x^2}{4\sigma_x^2} - \frac{y^2}{4\sigma_y^2}\right), \tag{13}$$

where $\sigma_x$ and $\sigma_y$ are the standard deviation (a measure of width) of the PSF in x and y direction respectively. For a given PST, $\sigma_x$ and $\sigma_y$ are known parameters and set to $\sigma_y=\sigma_y$ in our study. We define the full width at half maximum (proportional to $\sigma_x$) of the PSF as Rayleigh length (rl) in our analysis.

The parameters of interest in this problem are the position and relative brightness of the P emitters, i.e. $\theta=[x_1, \ldots, x_P, y_1, \ldots, y_P, b_1, \ldots, b_P]^T=[x,y,b]^T$.

For the positions $[x,y]^T$, we use independent Gaussian distribution $\mathcal{N}$ as prior:

$$p(x, y) = \prod_i^P \mathcal{N}(x_i; \bar{x}_i, \bar{\sigma}_{x_i})\mathcal{N}(y_i; \bar{y}_i, \bar{\sigma}_{y_i}), \tag{14}$$

where for $1\leq i\leq P$, $\bar{x}_i$, $\bar{y}_i$, $\bar{\sigma}_{x_i}$, $\bar{\sigma}_{y_i}$ are the mean and standard deviation of the position parameters $x_i$ and $y_i$ respectively.

For the brightness $b^T$ parameters a Dirichlet distribution is used as prior: $p(b)=\mathrm{Dir}(b; a)$, where $a=[a_1, \ldots, a_P]^T$ are the hyper-parameters of the Dirichlet distribution. Thus, the overall prior is expressed as: $p(x,y,b)=p(x,y)p(b)$.

Now we have defined all relevant detail (i.e., photon state density operator, prior distribution) for the proposed adaptive sequential measurement scheme described in the previous section. As p(x,y,b) is not a conjugate prior for the Poisson likelihood, we update the hyper-parameters of the prior distribution at $\tau^{th}$ iteration to derive the posterior, which assumes the role of the prior in the next $\tau+1^{th}$ iteration. The prior hyper-parameters are: $h=[\bar{x}_1, \ldots, \bar{x}_P, \bar{y}_1, \ldots, \bar{y}_P, \bar{\sigma}_{x_1}, \ldots, \bar{\sigma}_{x_P}, \bar{\sigma}_{y_1}, \ldots, \bar{\sigma}_{y_P}, a_1, \ldots a_P, \delta]^T=[\bar{x}, \bar{y}, \bar{\sigma}_x, \bar{\sigma}_y, a, \delta]^T$. Here, $\delta$ is another hyper-parameter associated with the brightness prior distribution explained later. To update the hyper-parameters of the position prior at the $\tau+1^{th}$ iteration, we use the first- and the second-moments of the posterior distribution at the $\tau^{th}$ iteration:

$$\bar{\alpha}_i^{(\tau+1)} = \int \alpha_i p(\theta^{(\tau)} \mid l^{(\tau)}; h^{(\tau)}) d\theta^{(\tau)}, \tag{15}$$

$$\bar{\sigma}^2_{\alpha_i^{(\tau+1)}} = \int [\alpha_i - \alpha_i^{(\tau+1)}]^2 p(\theta^{(\tau)} \mid l^{(\tau)}; h^{(\tau)}) d\theta^{(\tau)}, \tag{16}$$

where $\alpha$ represents x or y coordinate.

For the hyper-parameters $a^T$ of the brightness prior, expectation maximization approach is used. We first find the mean of the brightness vector as:

$$\hat{b}_i^{(\tau+1)} = \int b_i p(\theta^{(\tau)} \mid l^{(\tau)}; h^{(\tau)}) d\theta^{(\tau)}. \tag{17}$$

Then, $\alpha^T$ is updated such that $\hat{b}^{(\tau+1)}$ becomes the mode $$\begin{aligned} a^{(\tau+1)} &= \hat{b}^{(\tau+1)}\left[a_0^{(\tau)} + \delta^{(\tau)} - P\right] + 1 \\ &= \hat{b}^{(\tau+1)}\left[a_0^{(\tau+1)} - P\right] + 1 \end{aligned}, \tag{18}$$

where $$a_0^{(\tau)} = \sum_i^P a_i^{(\tau)} \text{ and } a_0^{(\tau+1)} = a_0^{(\tau)} + \delta^{(\tau)}.$$

Roughly speaking, the larger the $$a_0^{(\tau)},$$

the smaller the total variance of the Dirichlet distribution. Adding $$\delta^{(\tau)} \geq 0 \text{ leads to } a_0^{(\tau+1)} \geq a_0^{(\tau)},$$

such that the variance reduces monotonically with each iteration $\tau$. Note that the introduction of $\delta^{(\tau)}$ does not change the position of the mode in the distribution. We set $\delta^{(\tau)}$ to a constant for all $\tau$.

We demonstrate the performance of the proposed adaptive sequential measurement scheme for 10 distinct realizations of 4 point emitter constellations. The position of the point emitters are generated inside a circle with radius of 0.25 rl (Rayleigh length) with the minimum emitter separation set to 0.1 rl. The relative brightness are chosen to be uniform. The total photon budget is set to $5\times10^5$ and each adaptive sequential step utilizes $10^4$ photons. The adaptive sequential scheme is initialized by employing 1000 photons for a direct imaging measurement followed by expectation maximization (EM) algorithm to estimate the initial model parameters. The remaining photons are detected by using Personick projection measurement in each adaptive sequential step.

For traditional direct imaging (baseline), Richardson-Lucy deconvolution algorithm is first used deconvolve the blurred image followed by the k-mean clustering algorithm to find the position and relative brightness of identified point emitters. If P is known a priori, the k-mean clustering algorithm is used once for P; otherwise the algorithm is used for all $P_{min} \leq P \leq P_{max}$ and the model (n) that produces the smallest average (over all P) position error is picked. Here the position error for the $i^{th}$ point emitter is defined as:

$$\sqrt{(x_i - \hat{x}_i)^2 + (y_i - \hat{y}_i)^2}.$$

Figure 5A:
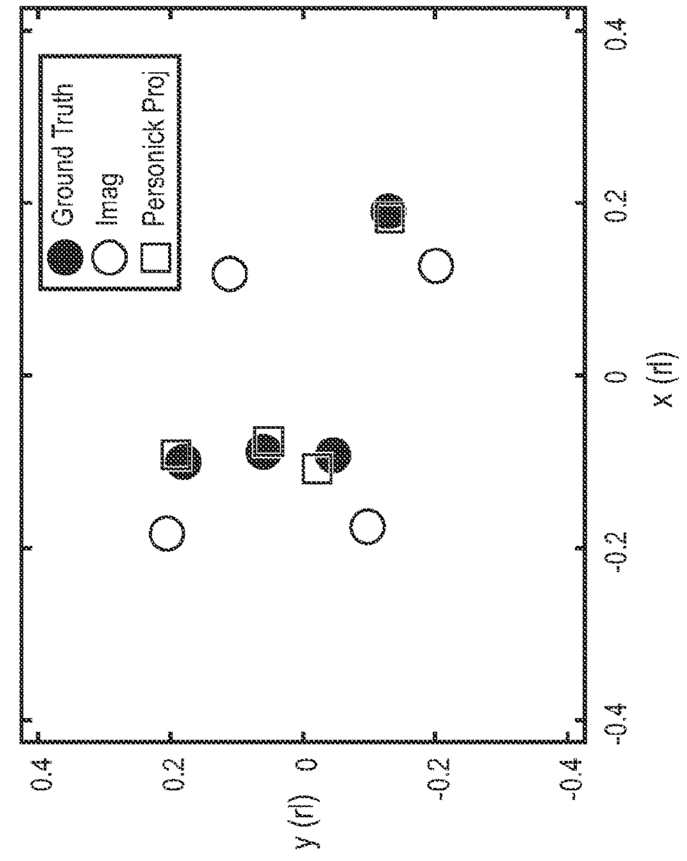
FIG. 5A is a plot of an example of estimation given by direct imaging and Personick projection measurement.
Figure 5B:
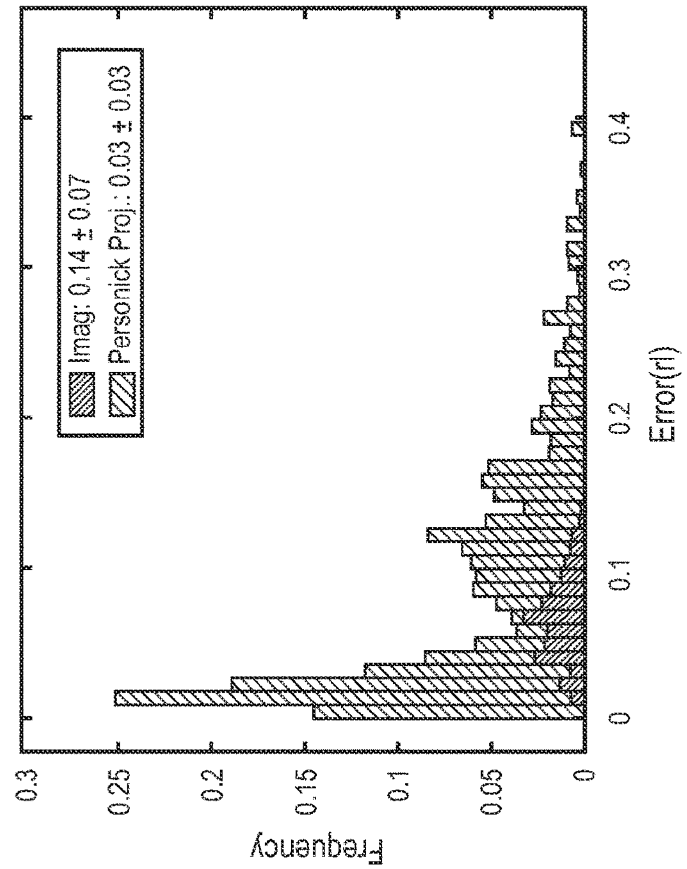
FIG. 5B is a plot of the distribution of the point emitter position errors obtained direct imaging versus Personick projection, when the number of emitters is known exactly.

For each of the 10 constellations, we employ 100 Monte Carlo simulation. FIG. 5A shows an illustrative realization of the point emitter cluster and estimated location and brightness using the two measurement schemes. The example of FIG. 5A corresponds to estimation given by direct imaging and Personick projection measurement, when the number of emitters is given as a prior. The solid dots, circles, and squares are the ground truth, estimation from direct imaging, and Personick projection measurement respectively. All the marker sizes are proportional to the brightness. To obtain the average performance of the proposed measurement scheme, for each point emitter realization, we first pair the ground truth point emitter location with the estimated locations, such that the sum of the position errors over all point-source matched pairs is minimized. The average (over all emitters) position error distribution of the point emitters is shown in FIG. 5B. We observe that the proposed adaptive scheme outperforms the direct imaging. More specifically, the mean position error obtained by the adaptive scheme is four-fold lower than that of the direct imaging.

Figure 5D:
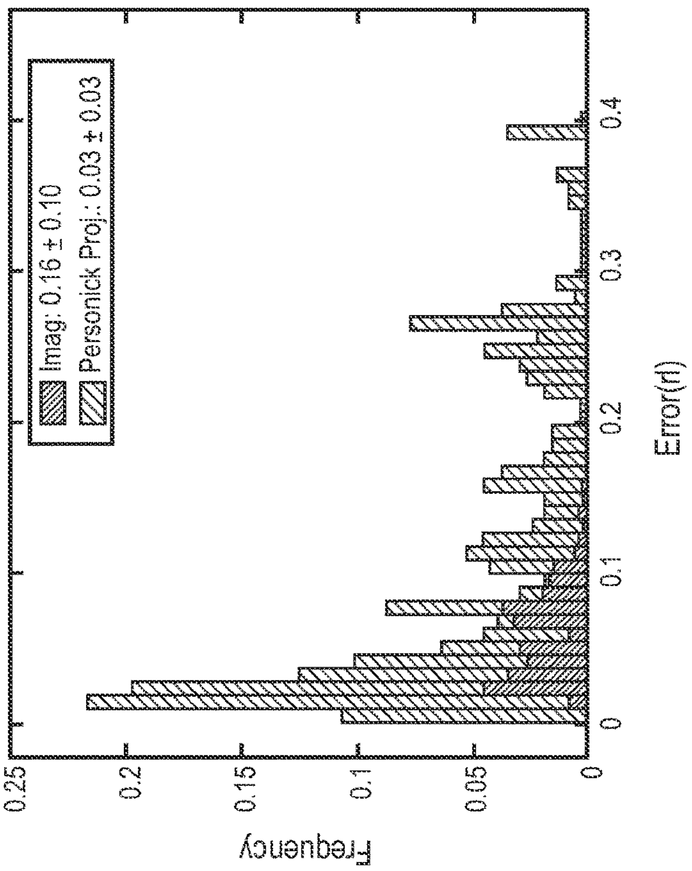
FIG. 5D is a plot of the distribution of the point emitter position errors obtained with direct imaging versus Personick projection, when the number of emitters is not previously known.
Figure 5C:
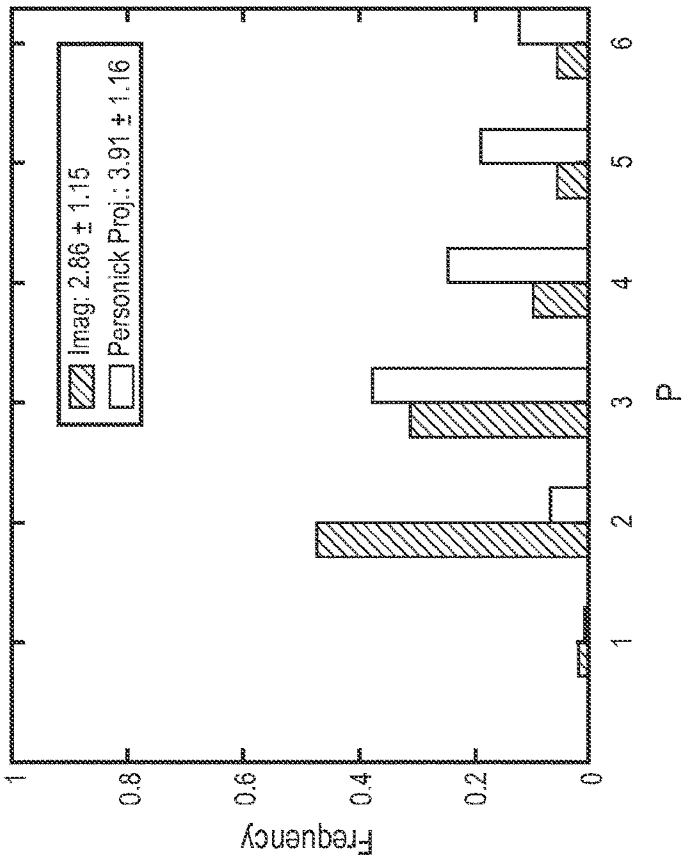
FIG. 5C is a plot of the distribution of the number of point emitters estimated by direct imaging and Personick projection.

When $P_{max}=6$ is given as a prior, the estimation algorithm has to also estimate P. For the same set of constellations and using the same number of simulations, the distribution of number of point, emitters estimated by the two measurement schemes in shown in FIG. 5C. We observe that the adaptive Personick projective scheme estimates the correct number of point emitters with a 30% success rate relative to only 10% for direct imaging. FIG. 5D shows the corresponding position error distribution, computed only for cases where P is estimated correctly. We observe that when the P is estimated correctly the proposed adaptive scheme maintains the significant performance advantage over direct imaging.

Based on quantum estimation theory, we have described examples of a quantum adaptive Bayesian multi-parameter estimation scheme. In prophetic examples, we applied our proposed approach to super-resolving point emitters in an imaging application and demonstrated its superiority to the state-of the-art direct imaging approach. This demonstrates that quantum estimation theory applied to sensing and imaging measurement design problems can yield significant gains by increasing (in some cases maximizing) the photon information extraction with certain optical measurements.

The spatial mode sorting may be performed with various optical configurations, as discussed below.

Figure 6A:
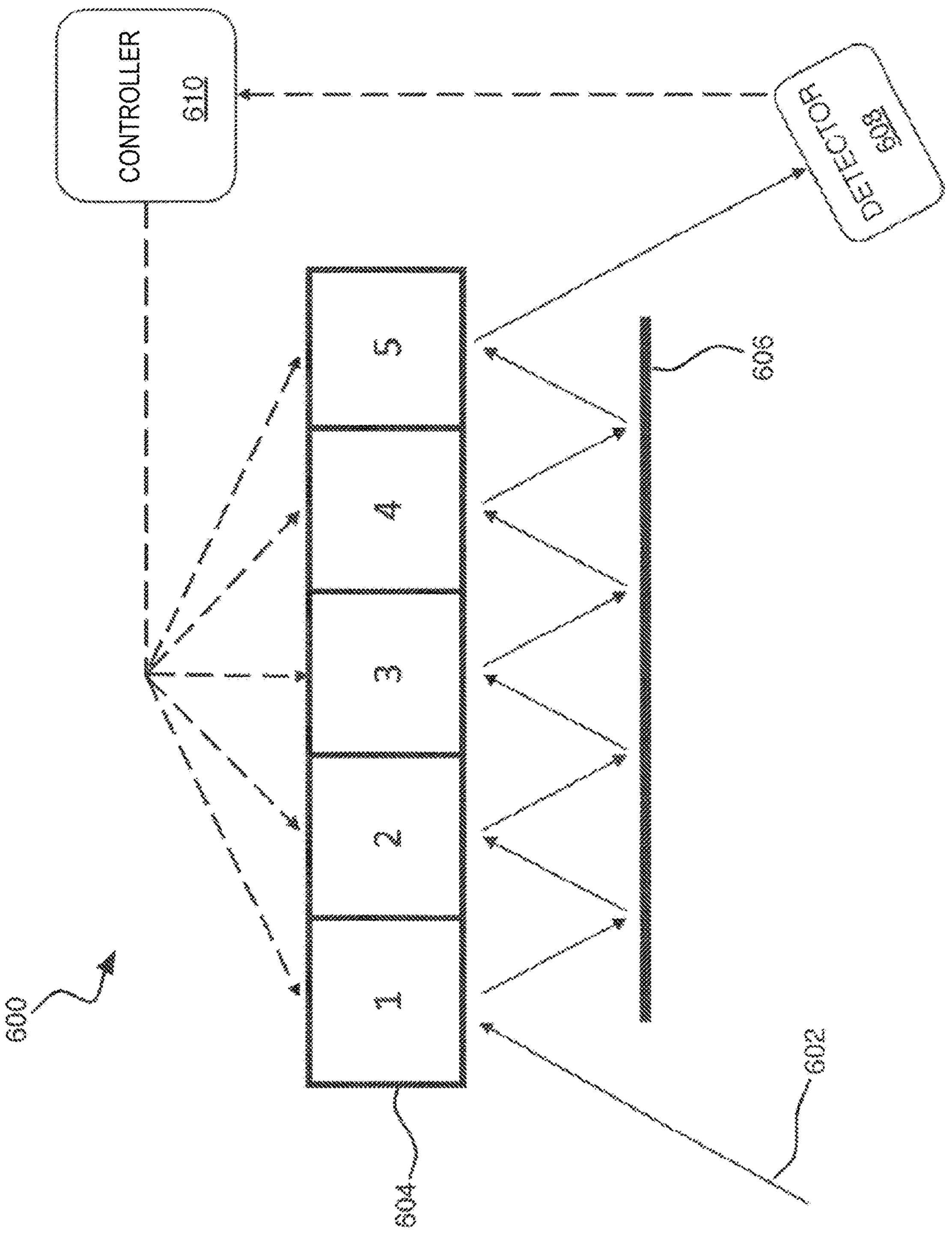
FIG. 6A is a schematic diagram of an implementation of a spatial mode sorter system.

FIG. 6A shows an example of a spatial mode sorting system 600. The incoming beam 602 reflects off a spatial light modulator 604 containing five independently controlled regions that modifies the intensity or phase of the incoming beam 602. A mirror 606 reflects the incoming beam 602 after it has interacted with one or more of the regions of the spatial light modulator 604. The incoming beam 602 is then sent to a detector 608, such as an EMCCD or CMOS camera. The information produced by the detector is then sent to a controller 610 that includes a processor, such as an FPGA, which can then control the intensity and phase of future incoming light 602 after reflecting from the spatial light modulator 604.

Figure 6B:
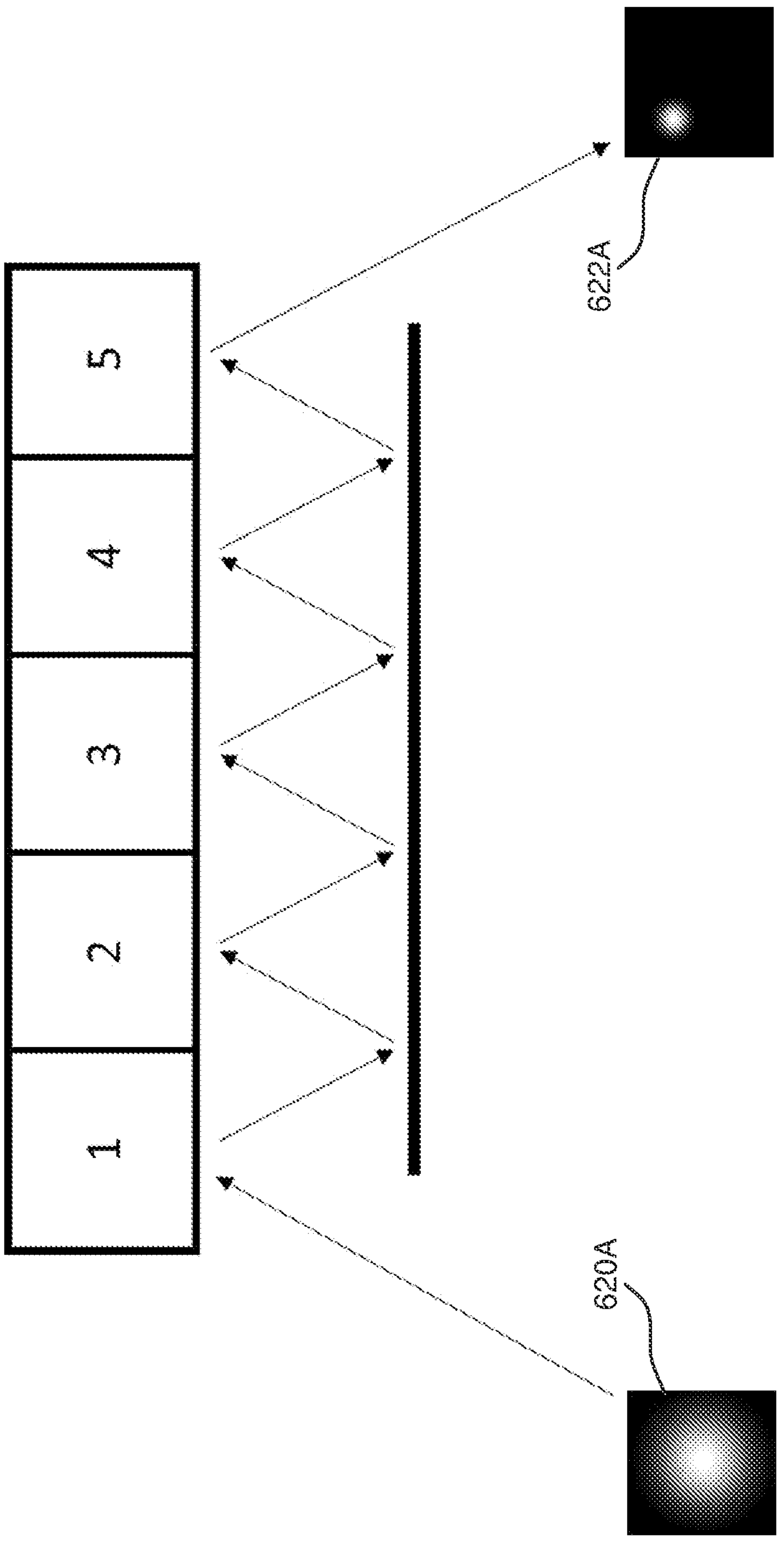
FIG. 6B is a schematic diagram illustrating the sorting of a first spatial mode.

FIG. 6B shows the spatial mode sorting system 600 with an incoming beam containing a first mode 620A and sorting it to a first region of the detector image 622A.

Figure 6C:
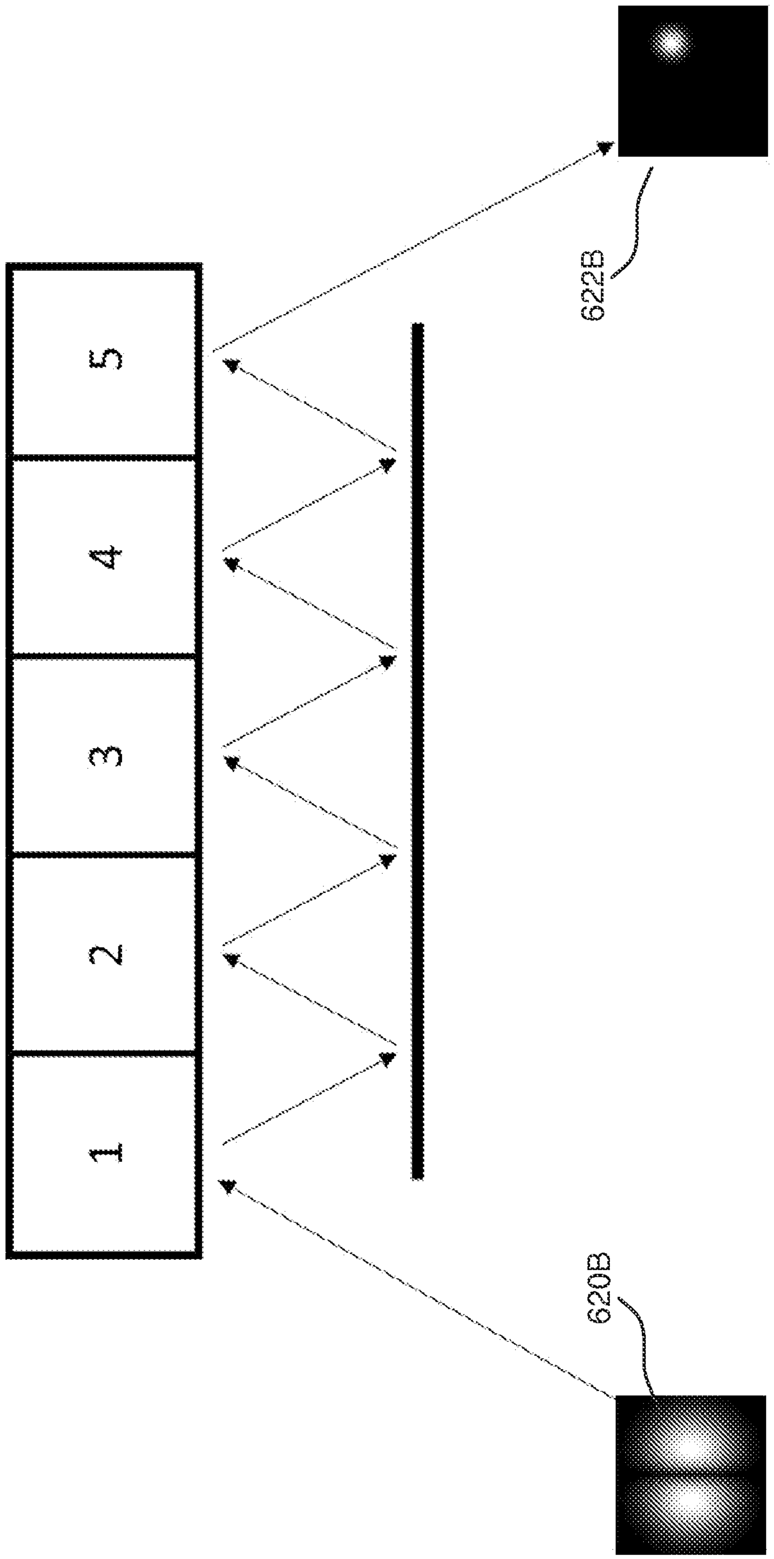
FIG. 6C is a schematic diagram illustrating the sorting of a second spatial mode.

FIG. 6C shows the spatial anode sorting system 600 with an incoming beam containing a second mode 620B and sorting it to a second region of the detector image 622B.

Figure 6D:
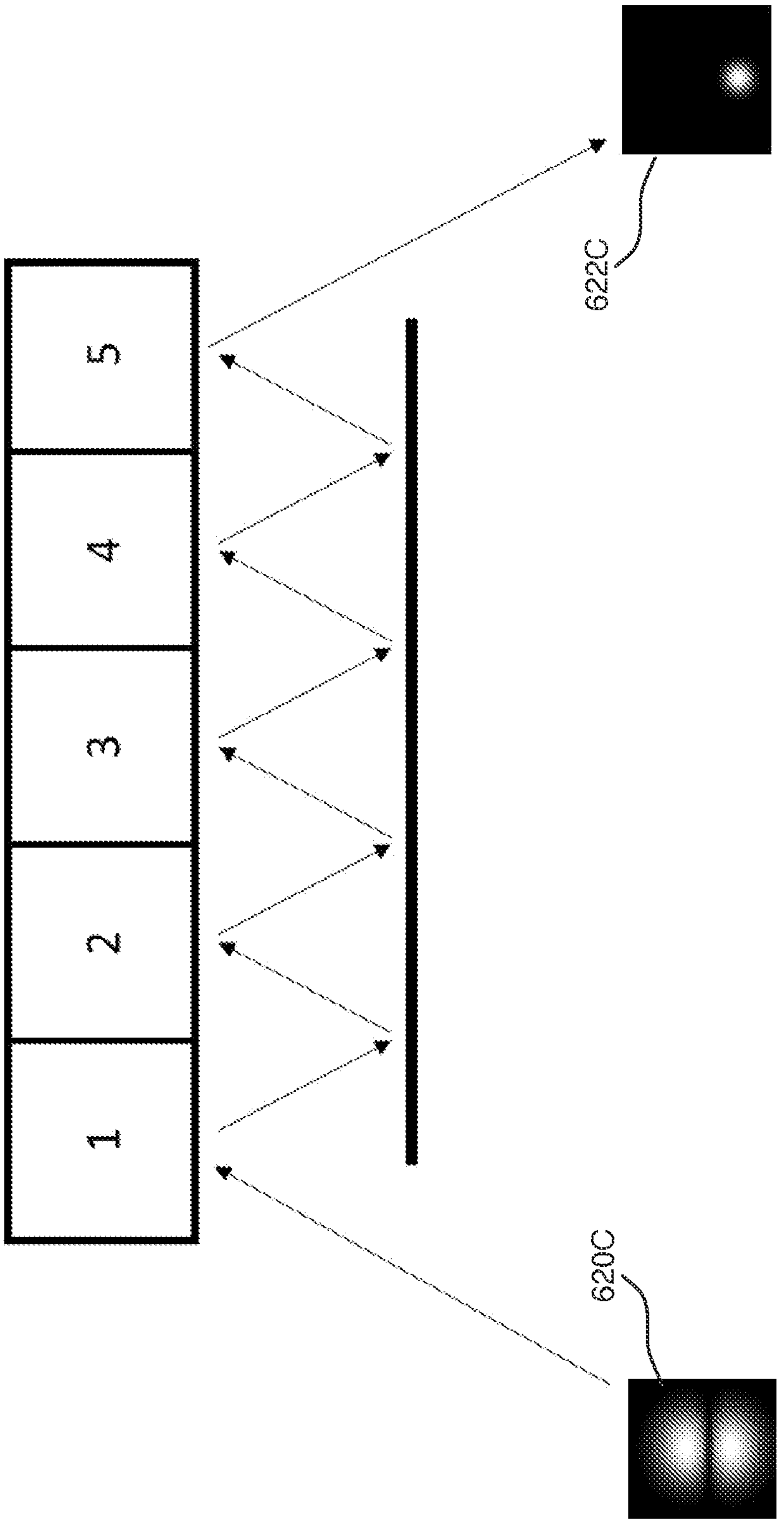
FIG. 6D is a schematic diagram illustrating the sorting of a third spatial mode.

FIG. 6D shows the spatial mode sorting system 600 with an incoming beam containing a first mode 620C and sorting it to a third region of the detector image 622C.

If a superposition of the modes 620A, 620B, and 620C is received in the beam 602, the ratio of the spot intensities on the resulting detector image can be used to infer the relative strength of the modes in the received beam 602.

Figure 7:
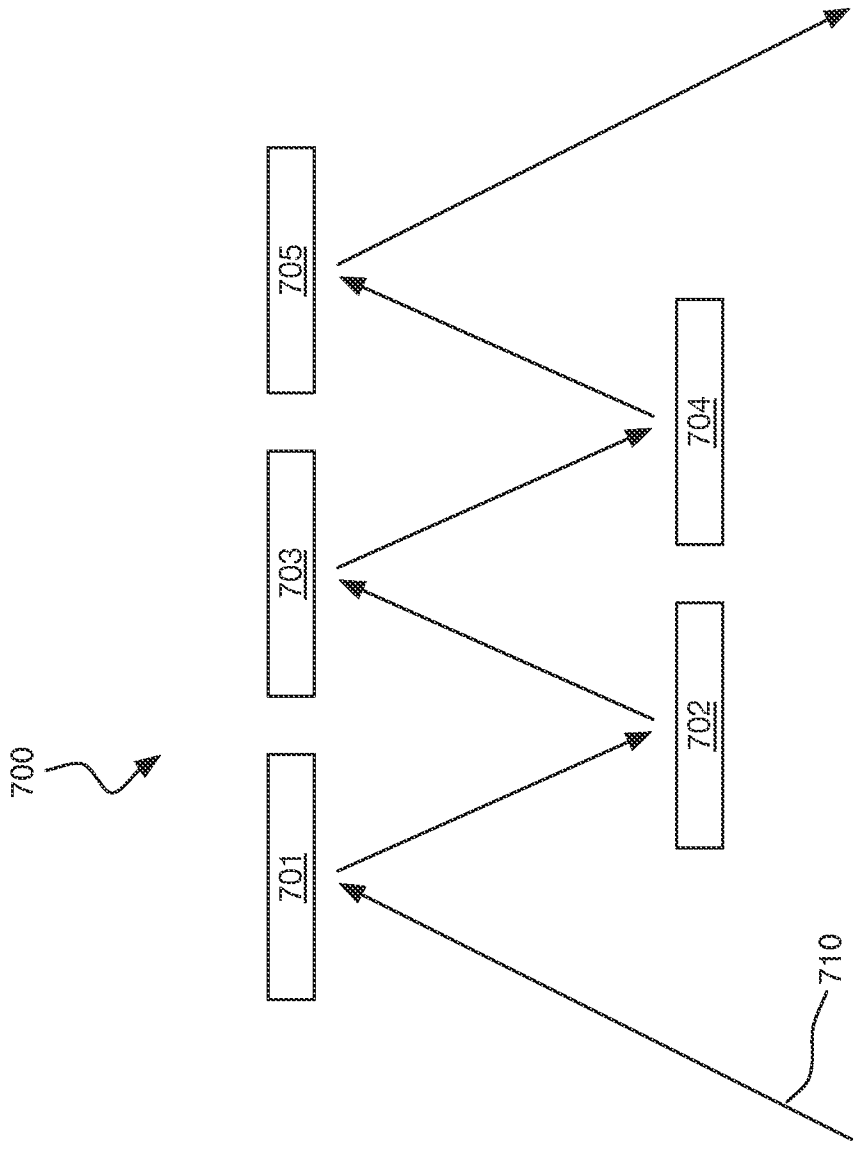
FIG. 7 is a schematic diagram of a second implementation of a spatial mode sorter.

FIG. 7 shows a second example of a spatial mode sorting system 700. A first spatial light modulator 701 reflects and modifies the intensity or phase of the incoming beam 710. A second spatial light modulator 702, a third spatial light modulator 703, a fourth spatial light modulator 704, and a fifth spatial light modulator 705 further reflect and modify the intensity or phase of the incoming beam 710.

Figure 8:
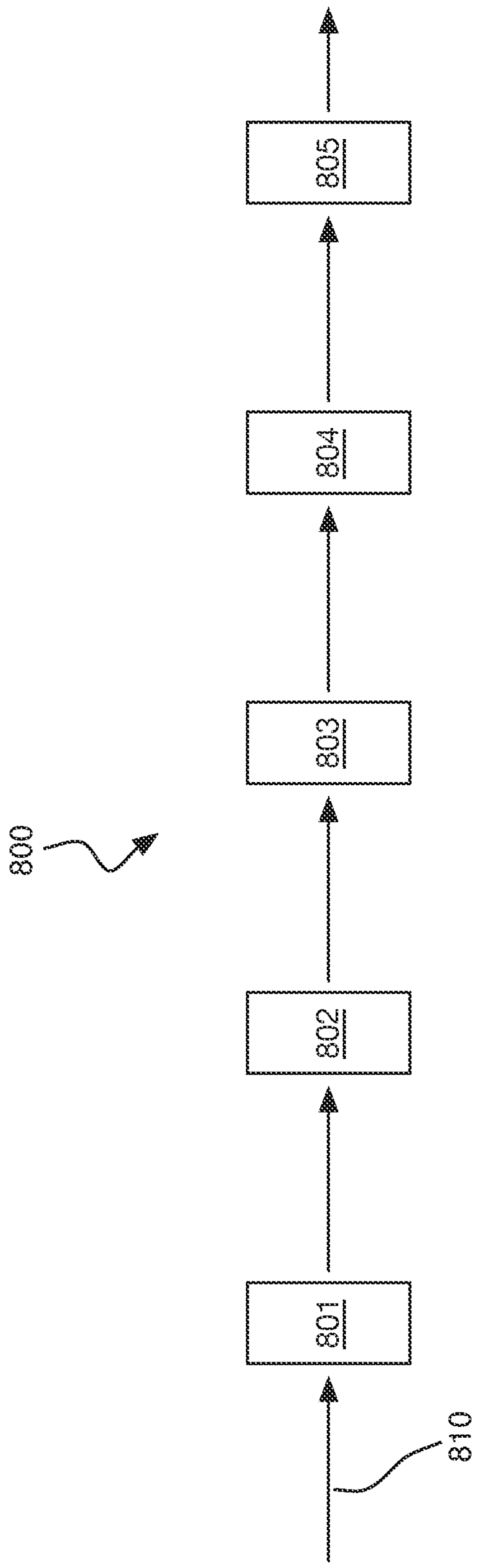
FIG. 8 is a schematic diagram of a third implementation of a spatial mode sorter.

FIG. 8 shows a third example of a spatial mode sorting system 800. A first spatial light modulator 801 transmits and modifies the intensity or phase of the incoming beam 810. A second spatial light modulator 802, a third spatial light modulator 803, a fourth spatial light modulator 804, and a fifth spatial light modulator 805 further transmit and modify the intensity or phase of the incoming beam 810.

The techniques described above for controlling and configuring a spatial mode sorting system can be implemented using software for execution on a computer system. For example, the software can define procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a non-transitory medium such as a computer-readable storage medium (e.g., solid state memory or media, or magnetic or optical media) readable by a general or special purpose programmable computer system, or delivered over a communication medium (e.g., encoded in a propagated signal) such as network to a computer system where it is stored in a non-transitory medium and executed. Each such computer program can be used to configure and operate the computer system when the non-transitory medium is read by the computer system to perform the procedures of the software.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for imaging a distribution of one or more optical sources, the method comprising:
 for each time interval of a plurality of time intervals:
  detecting an optical signal outputted by a spatial mode sorter to generate one or more electrical signals;
  processing information based at least in part on:
  (1) the one or more electrical signals generated during the time interval;
  (2) a first set of models comprising a first set of model distributions related to at least one of the one or more optical sources, each model of the first set of models corresponding to a different number of the one or more optical sources in the distribution; and
  (3) a second set of models comprising a second set of model distributions related to at least one of the one or more optical sources, the second set of model distributions being determined by the first set of model distributions and one or more electrical signals generated during a previous time interval of the plurality of time intervals; and
  configuring the spatial mode sorter based at least in part on the processed information; and
 providing an estimated characterizing the distribution of the one or more optical sources, the estimate being based at least in part on the processed information;
 wherein processing information for each time interval includes computing an eigen-projection.

2. The method of claim 1, wherein configuring the spatial mode sorter comprises configuring the spatial mode sorter to project the optical signal onto a basis of the computed eigen-projection.

3. The method of claim 1, wherein the first set of models includes a set of spatial distributions for the one or more optical sources.

4. The method of claim 3, wherein the first set of models further includes a set of Bayesian prior probability distributions for the set of spatial distributions.

5. The method of claim 4, wherein the set of Bayesian prior probability distributions for the set of spatial distributions includes a set of Gaussian distributions.

6. The method of claim 5, wherein a set of hyper-parameters for the Gaussian distributions are based at least in part on a result of an expectation maximization calculation that is based at least in part on the processed information.

7. The method of claim 1, wherein the first set of models includes a set of brightness distributions for the one or more optical sources.

8. The method of claim 7, wherein the first set of models further includes a set of Bayesian prior probability distributions for the set of brightness distributions.

9. The method of claim 8, wherein the set of Bayesian prior probability distributions for the set of brightness distributions includes a set of Dirichlet distributions.

10. The method of claim 9, wherein a set of hyper-parameters for the set of Dirichlet distributions is based at least in part on a result of an expectation maximization calculation that is based at least in part on the processed information.

11. The method of claim 1, wherein the eigen-projection is the eigenvectors of a symmetric logarithmic derivative operator.

12. The method of claim 11, wherein the symmetric logarithmic derivative operator is based at least in part on a set of one or more operators constructed from a single-parameter inference setting.

13. The method of claim 1, wherein the eigen-projection is the eigenvectors of an operator constructed from a Bayesian inference setting.

14. The method of claim 13, wherein the operator constructed from the Bayesian inference setting is based at least in part on a set of one or more operators constructed from a single-parameter Bayesian inference setting.

15. The method of claim 1, wherein the eigen-projection comprises a Personick eigen-projection.

16. The method of claim 1, wherein processing includes computing a quantum Fisher information matrix associated with the one or more electrical signals.

17. The method of claim 1, wherein processing includes computing a modified quantum Fisher information matrix derived in a Bayesian inference setting and associated with the one or more electrical signals.

18. One or more non-transitory computer-readable media, having instructions stored thereon that, when executed by a computer system, cause the computer system to perform operations for imaging a distribution of one or more optical sources, the operations comprising:

for each time interval of a plurality of time intervals:

receiving, from a camera, one or more electrical signals generated in response to the camera detecting an optical signal outputted by a spatial mode sorter;

processing information based at least in part on:

(1) the one or more electrical signals generated during the time interval;

(2) a first set of models comprising a first set of model distributions related to at least one of the one or more optical sources, each model of the first set of models corresponding to a different number of the one or more optical sources in the distribution; and (3) a second set of models comprising a second set of model distributions related to at least one of the one or more optical sources, the second set of model distributions being determined by the first set of model distributions and one or more electrical signals generated during a previous time interval of the plurality of time intervals; and configuring the spatial mode sorter based at least in part on the processed information; and providing an estimated characterizing the distribution of the one or more optical sources, the estimate being based at least in part on the processed information;

wherein processing information for each time interval includes computing an eigen-projection.

19. An apparatus for imaging a distribution of one or more optical sources, the apparatus comprising:

a spatial mode sorter configured to project an incoming optical signal onto a configurable basis to generate a projected optical signal;

a camera configured to generate one or more electrical signals in response to detecting the projected optical signal; and a controller that includes a processor configured to:

for each time interval of a plurality of time intervals:

process information based at least in part on:

(1) the one or more electrical signals generated during the time interval;

(2) a first set of models comprising a first set of model distributions related to at least one of the one or more optical sources, each model of the first set of models corresponding to a different number of the one or more optical sources in the distribution; and (3) a second set of models comprising a second set of model distributions related to at least one of the one or more optical sources, the second set of model distributions being determined by the first set of model distributions and one or more electrical signals generated during a previous time interval of the plurality of time intervals; and configure the spatial mode sorter based at least in part on the processed information; and provide an estimated characterizing the distribution of the one or more optical sources, the estimate being based at least in part on the processed information;

wherein the processed information for each time interval includes an eigen-projection.

* * * * *